March 27, 1934.  E. W. O'MALLEY  1,952,726

VALVE STRUCTURE

Filed Dec. 21, 1932

Inventor
Edward W. O'Malley
By: Langum mmm
Atty.

Patented Mar. 27, 1934

1,952,726

UNITED STATES PATENT OFFICE 1,952,726

VALVE STRUCTURE

Edward W. O'Malley, Chicago, Ill.

Application December 21, 1932, Serial No. 648,145

2 Claims. (Cl. 251—27)

This invention relates to valve structures and more particularly to valve structures of the type generally known as globe valves.

The invention is of particular utility in connection with valves for railroad locomotives, in which service new and more severe requirements are constantly being imposed upon valve structures. Whereas, a few years ago the average run of a locomotive was only one hundred miles, present day engines are being built to make a continuous run of five hundred or even a thousand miles. The steam pressures have also been increased and even doubled. Consequently, a high degree of durability, efficiency and facility for quick repair is more desirable than ever before, in valves for this service.

Valve structures with removable wearing surfaces have been well known hitherto, but these have been objectionable since, when one of the mating surfaces has been deteriorated, the other is usually deteriorated also, and to restore the valve structure to perfect condition, both of these surfaces should be replaced. Even where this is possible and expected, it is difficult to get the ordinary workmen to do it. They can be readily taught to replace one of the surfaces but not both of them.

Among other objects, the present invention aims to provide an improved and economical valve structure in which one of the mating valve members, for example, the valve seat is formed of a material of such extreme hardness that it is practically indestructible and will not be affected by the usual causes which effect deterioration of conventional valve seats, while the other valve member, the valve itself for example, is provided with a replaceable face of a relatively softer material cooperating with the valve seat.

A further object of the invention is to provide a plurality of tapered face members for the valve so arranged as to cooperate successively with a tapered annular valve seat, as each face member becomes worn and is removed, thus combining the advantageous features of tapered mating members with the replaceable feature of my invention, and insuring a tight seal at all times.

Other objects and advantages will be apparent from the following description, taken together with the accompanying drawing showing an illustrative embodiment of the invention, in which—

Figure 1:
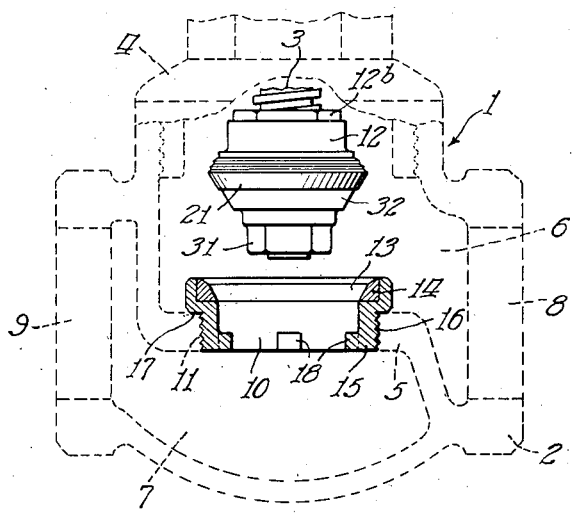
Figure 1 is a longitudinal view, partly in section and partly in elevation, illustrating an application of the invention in a valve structure, a conventional portion of which is shown in broken lines.

In the illustrative embodiment, I have shown, in general, a portion of a valve structure 1 having the usual casing 2, shown in broken lines, and which may include suitable operating mechanism, such as a hand-wheel or the like (not shown) appropriately connected with the threaded valve stem 3. As is well known in the art, the valve stem 3 may pass threadedly through a bonnet 4, also shown in broken lines, which may be detached from the casing 2 to afford access to the interior of the casing. By rotation of the valve stem in the bonnet 4, the stem may be reciprocated.

In this instance the casing 2, being for what is commonly known as a globe valve, is provided centrally thereof with an integral web 5 which divides the casing into two chambers 6 and 7, served respectively by ports 8 and 9, one of which may be the inlet and the other the outlet port for the valve structure.

The web 5 has a fluid passage 10 therethrough formed by a central aperture 11 in the web and this aperture is adapted to be closed by the valve when the valve head 12 is moved into the passage 10 by the valve stem 3 as explained. The valve head 12 is imperforate, but may have an interiorly threaded socket portion 12a into which the valve stem 3 is screwed to connect the valve and stem together. A lock nut 12b may assist in maintaining a secure and rigid connection between the valve and the stem.

In accordance with my invention, I provide a valve seat 13 in the passage 10 formed by grinding a tapered annular surface upon the inner periphery of a valve seat member here represented by the seamless insert ring 14 which is formed of an extremely hard and substantially non-corrodible material, desirably cold drawn nickel. As here shown, the insert ring 14 may be supported in the passage 10 by the web 5 through the intermediation of a brass bushing 15, which may be readily threaded as at 16 to be screwed tightly into the aperture 11 which may be circular and threaded correspondingly to receive the bushing, suitable means being provided for securing a fluid tight joint at this point. Such means may include a shoulder 17 on the bushing which is arranged to tightly abut the margin of the aperture 11. Thus the bushing 15, and the ring 14 carried thereby, margin the passage 10 concentrically with the axis of the valve head 12. The bushing 15 may have one or more notches 18 therein for the insertion of a tool for manipulating the bushing. The ring 14 may be secured in the bushing 15 by counterboring the bushing as at 19 to receive the ring and rolling a margin 20 of the bushing over the upper edge of the ring which may be chamfered to permit this. The structural details of the insert ring 14 and bushing 15 are further described and claimed in my copending application, Serial No. 640,452, filed October 31, 1932.

Further in accordance with my present invention, the valve head 12 is provided with a tapered annular replaceable face 21 of relatively soft material, say of steel of average hardness, adapted to mate and cooperate with the valve seat 13. The similarly tapered surfaces 13 and 21 permit the valve and valve seat to mate with a desirable plug-and-socket contact, or wedge action, while the ring 14 advantageously has the necessary strength to withstand this wedging action.

My invention contemplates furthermore a plurality of face members carried by the valve head 12 and each having a face similar to the face 21. To accomplish this I provide a number of, in this instance three, dish-shaped face members 22, 23 and 24, each face member embodying a flat plate portion 25 and an annular tapered face portion 26 directed away from the plate portion at an angle corresponding to the angle of the valve seat 13 to the axis of the valve. In order to nest these face members compactly upon the valve head 12, it is necessary that they be of different diameters. As here shown, the member 23 is just enough smaller than the member 22 to telescope within the latter and have snug contact throughout the concave interior of the member 22. Similarly, the member 24 is enough smaller than the member 23 to telescope therewithin with contact throughout. Lastly the valve head 12 itself has an annular tapered surface 27 and an annular shoulder 28 which fits snugly within the member 24, which is thus nearest the valve, having its plate portion abutting the shoulder 28 and its face portion abutting the surface 27. The seat 13 and the tapered annular face portions of the members 22, 23 and 24 desirably form a rather sharp angle with the axis of the valve to enhance the plug effect referred to.

To retain one or all of the face members 22, 23 and 24 in this described position upon the valve, the valve as here shown has an axial extension or stud 29 which is threaded as at 30 to have screwed thereon a retaining nut 31. The retaining nut 31 is provided with a radially extending annular flange 32 which may be screwed into abutment with the plate portion of one of the face members 22, 23 or 24 to clamp these members either singly or collectively against the shoulder 28 and thus retain them in appropriate position upon the valve head. To pass over the stud 29 the face members 22, 23 and 24 have central circular co-equal perforations 33 therein which, after being passed over the stud 29, slip snugly onto a circular boss 34 formed on the valve head 12 between the shoulder 28 and the stud 29.

Figure 2:
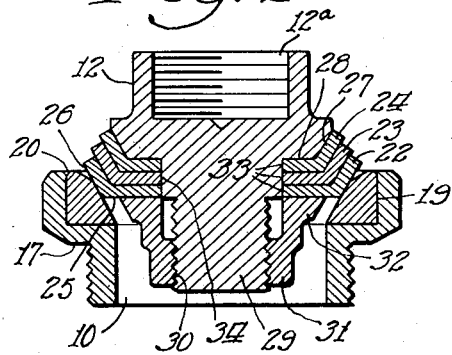
Figure 2 is an enlarged axial sectional view of valve parts embodying my invention as shown in Figure 1.

As shown in Figure 2, the valve head 12 is moved into closing position with respect to the passage 10 and the face 21 of the face member 24 is in snug relation with the valve seat 13. If during this closing movement of the valve a particle of foreign matter be lodged between the surfaces 21 and 13, in prior art structures, both of these surfaces would normally be worn thereby, but by the provisions of my invention, the hard seat 13 will not be worn and the wear, if any, will fall upon the relatively softer surface 21 which is replaceable. Thus only one of the mating valve surfaces requires attention. To effect this, the nut 31 may be unscrewed from off the stud 29, the face member 22 removed from the valve and discarded, and the nut 31 then screwed back upon the stud to clamp the remaining members 23 and 24 in position. When the valve is moved next into closing position a surface on the member 23, similar to the surface 21 on the member 22, will mate with the seat 13. Since the member 23 is of smaller diameter than the member 22, the valve head 12 will be moved a greater distance through the passage 10 to permit the face member 23 to snugly engage the valve seat, which it will do at a point where the valve seat is more contracted than in the case of the face member 22. Similarly, when the face member 23 becomes worn or deteriorated in any way, it may be similarly removed and discarded and the valve has still another mating surface provided by the face member 24 which snugly contacts with the seat 13 upon moving of the valve still further into the passage 10 as shown in Figure 3.

Figure 3:
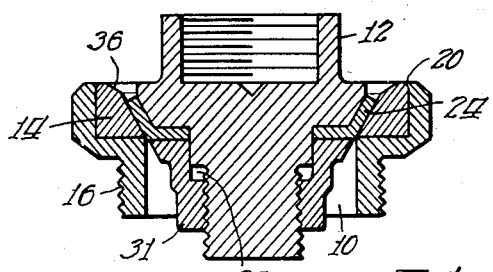
Figure 3 is a view similar to Figure 2 but illustrating a different operative position of the parts when some of the face members are removed.

To permit the flange 32 of the nut 31 to clamp any number less than all of the face members securely on the valve, the nut may be axially recessed as at 35 to permit the flange 32 to slide over the boss 34 on the valve as best shown in Figure 3.

If desired the ring 14 may be beveled as at 36 away from the seat 13 to insure or further enhance the plug or wedge engagement of the valve therewith.

So constructed and arranged, I have made possible an economical valve structure with mating valve members, one of which is so hard and tough that it cannot be readily machined or screw-threaded, but may be ground to provide a highly efficient valve seat thereon, which is substantially indestructible, while at the same time, I have combined therewith a valve having a plurality of successively removable face members.

As at present advised, there is a still further cooperation between these elements as employed in my novel structure, in that if the softer surface 21 becomes scored or deteriorated, the very much harder surface 13 may desirably tend to grind down the surface 21 again to a true mating surface, since the valve contacts with the seat 13 by a helical movement due to the rotative as well as reciprocal action of the stem 3.

As described and claimed in my copending application hereinbefore referred to, the insert ring 14 is conveniently produced by cold drawing seamless nickel chrome tubes, which may be obtained commercially, to correct size inside and out for a particular valve structure, the cold drawn tube being then sawed into rings and ground to the contour shown in the drawing as already explained. A preferred composition may contain 88 per cent nickel and 12 per cent chrome.

Having described my invention, I claim:

1. As an article of manufacture, a valve structure comprising, in combination, a casing; a bushing secured therein; a valve seat member carried by said bushing, said seat member embodying an annulus of material relatively harder than said bushing and having an annular tapered seat; a valve head carrying a plurality of removable dish-shape face members of relatively soft material, each face member embodying a flat plate portion and an annular tapered face portion for cooperating with the seat, said face members being of different diameters to nest one within the other, the one nearest said valve head being of smallest diameter and the valve head having surfaces mating with the concave interior of said nearest face member; and means for clamping the face members to the valve head.

2. In a valve structure, the combination including a fluid passage; an annular tapered valve seat in said passage; a valve head reciprocable in said passage, said valve head having a threaded stud portion passing centrally through said annular seat and an annular face tapered to correspond with said seat together with an annular shoulder between said stud portion and said face portion; a plurality of replaceable dish-shaped face members each face member having a flat plate portion and an annular tapered face portion for cooperating with the seat, said face members being of different diameters to nest one within the other, the face member of smallest diameter being nearest the valve head and having its plate portion abutting the shoulder of the valve head and its face portion abutting the face portion of the valve head; and a clamping nut threaded on the valve head stud and provided with an annular flange clamping the plate portions of said face members against said shoulder.

EDWARD W. O'MALLEY.